United States Patent Office 2,848,470
Patented Aug. 19, 1958

2,848,470

TRICHLOROBENZOIC ACID COMPOSITIONS

Theodore A. Girard, Wayne Township, Passaic County, Eugene P. Di Bella, Garfield, and Henri Sidi, Paramus, N. J., assignors to Heyden Newport Chemical Corporation, New York, N. Y., a corporation of Delaware No Drawing. Application September 26, 1957
Serial No. 686,272

4 Claims. (Cl. 260—429)

The present invention relates to certain novel and valuable trichlorobenzoic acid products containing 2,3,6-trichlorobenzoic acid having unexpected, new and valuable properties.

This application is a continuation in part of our copending parent application Serial No. 463,824, filed October 21, 1954, now abandoned. This parent application relates to the production of trichlorobenzoic acids and to certain products obtained thereby. Our copending application Serial No. 615,778, filed October 15, 1956, also is a continuation in part of our copending parent application Serial No. 463,824, now abandoned and relates more particularly to the production of trichlorobenzoic acids. The present application relates to our new and valuable empirical products which are mixtures of isomers, with the 2,3,6-isomer constituting at least 15% and preferably at least 50% of the mixture with the optimum minimum amount of the 2,3,6-isomer being 60%.

In accordance with our process, more fully described in the above-mentioned copending applications, mixtures of isomers of trichlorobenzoic acid, including the 2,3,6-isomer, are produced in high yield from the corresponding trichlorobenzyl halides. These halides may be prepared in any suitable manner and may be prepared by nuclear-chlorinating toluene, o-chlorotoluene, m-chlorotoluene or various dichlorotoluenes or mixtures thereof to form trichlorotoluene which is, in turn, chlorinated in the side chain to form trichlorobenzyl chloride. The trichlorobenzyl chloride formed in such a manner is a mixture of isomers containing the 2,3,6-isomer, and the trichlorobenzoic acid produced therefrom is a mixture of isomers containing 2,3,6-trichlorobenzoic acid. In a preferred embodiment of our process, we prefer to nuclear-chlorinate toluene or o-chlorotoluene in the presence of a catalyst to form a mixture of dichlorotoluenes, trichlorotoluenes and tetrachlorotoluenes. The yield of trichlorotoluene, as well as the amount of 2,3,6-trichlorotoluene present in the trichlorotoluene fraction depends on a number of factors, including the catalyst used, the starting material employed and the process conditions followed. The mixed isomers of the trichlorotoluene fraction preferably, but not necessarily, after being separated, can be converted to trichlorobenzoic acid by side-chain chlorination of the trichlorotoluene to form trichlorobenzyl chloride, which can be esterified with an alkali metal salt of an aliphatic acid to form the corresponding trichlorobenzyl ester of the acid. This ester is oxidized to trichlorobenzoic acid using, for example, nitric acid as an oxidizing agent. Under optimum conditions, using o-chlorotoluene as a starting material, the trichlorobenzoic acid will contain about 50% to 75% of the 2,3,6-isomer. However, mixed isomers of trichlorobenzoic acid containing higher or lower amounts of 2,3,6-trichlorobenzoic acid may be produced in accordance with the processes described in our parent application Serial No. 463,824, now abandoned, or our copending application Serial No. 615,778.

We prefer to distill the reaction mixture resulting from the chlorination of the starting material, such starting material usually being toluene or o-chlorotoluene, in order to obtain the trichlorobenzyl chloride which is subjected to esterification followed by oxidation. Such trichlorobenzyl chloride, while relatively pure as compared with an undistilled mixture, is normally a rather crude product nevertheless. While it is considered commercially impracticable to do so, the mixture mentioned may be very carefully distilled if desired, or otherwise treated to produce a virtually pure trichlorobenzyl chloride, or the reaction mixture resulting from the esterification may be distilled or otherwise treated to isolate a virtually pure ester for oxidation although this step is also considered to be commercially impracticable.

On the other hand, the undistilled reaction mixture resulting from the chlorination of the starting material may be esterified and then oxidized. In this event, it will be appreciated that the mixture subjected to esterification and then to oxidation contains di, tri and tetrachlorobenzyl chloride. Thus, the di and tetrachlorobenzyl compounds may react while the reaction of the trichlorobenzyl compounds is going on and, of course, it is possible that products other than the mixed isomers of trichlorobenzoic acid contemplated by the present invention may be formed as a result of the esterification and oxidation steps. Accordingly, the mixed isomers of trichlorobenzoic acid referred to herein and in the annexed claims, unless specified to the contrary, cover such mixed isomers in the pure or impure state.

A special utility has been found to reside in our product referred to herein as the mixture of isomers of trichlorobenzoic acid containing the 2,3,6-isomer. This resides in its special utility and unexpected properties as a herbicide. The product demonstrates a high degree of herbicidal activity generally comparable with and in some uses superior to that of 2,4 dichlorophenoxy acetic acid, commonly known as "2-4-D." In particular, it has been found useful in the process of weed control invented by Nathaniel Tischler, which is the subject of his copending application Serial No. 622,739, filed November 19, 1956, and which is a continuation-in-part of his application Serial No. 463,829, now abandoned, filed on the same day as our parent application of this application.

The Tischler process involves the application to the soil of 2,3,6-trichlorobenzoic acid or the salts thereof in order to protect certain crops defined in the aforementioned application such as corn or sugar cane against weed growth subsequent to preparation of the soil for planting. In one way of carrying out this process, our mixed isomer product, although containing, for example, only about 70% of the 2,3,6-isomer, gives results equivalent to those of the pure 2,3,6-isomer. The other isomers present, of which the 2,4,5-isomer generally is the major one, do not individually have herbicidal activity at all comparable with that of the 2,3,6-isomer. Consequently, one would have supposed that a total content of such other isomers of the order of 30% would have a diluent effect requiring the use of an increased dosage to give results comparable to those of the 2,3,6-isomer alone. Nevertheless, this mixture of isomers has been tested on a pound for pound basis with "2-4-D" and found to be practically as effective as pure 2,3,6-trichlorobenzoic acid when the latter is tested under like conditions.

We have no explanation of the apparent equivalence between the mixed isomer product and the pure 2,3,6-isomer and are forced to an entirely empirical view of this mixed isomer product as a herbicide. The 2,3,6-isomer is probably responsible in a major way for the great effectiveness of our mixed isomer product as a herbicide, By taking into consideration the relative ineffectiveness of the other isomers as compared to the 2,3,6-isomer, it is obvious that the total effect of the mixed isomer product is greater than the sum of the effects of the 2,3,6-isomer and the other isomers taken independently. In other words, the isomer product is synergistically effective as a herbicide.

For particular examples of the utility of this material where the effects are markedly superior to those of an equal weight of "2-4-D," reference is made to the previously mentioned Tischler applications. The material is also useful when applied as a herbicide to the foliage of growing plants and as an article of manufacture; the novel mixture, therefore, has utility as a herbicide without limitation to the particular process described in the Tischler applications.

The preferred mixture for herbicidal use is one which, in terms of isomer composition as determined by analysis, contains at least about 60% of 2,3,6-trichlorobenzoic acid based on the total weight of the mixed isomers of this acid, as such a mixture is substantially as effective as pure 2,3,6-trichlorobenzoic acid. Mixed isomers containing much less 2,3,6-trichlorobenzoic acid display this unexpected effectiveness. Although a mixture of isomers containing about 50% of the 2,3,6-isomer is not quite as effective, it is almost as effective as a mixture containing, for example 70% of the 2,3,6-isomer. While a mixture of isomers containing as little as 15% by weight of the 2,3,6-isomer is not as effective as mixtures containing 50% or 60% of the 2,3,6-isomer, such a mixture is more effective herbicidally than would be expected from the relatively small amount of 2,3,6-isomer and the large amount of substantially ineffective other isomer or isomers. Accordingly, while a mixture of isomers containing 50% or more of the 2,3,6-isomer is preferred, with a mixture of isomers containing 60% of the 2,3,6-isomer being the optimum product, a mixture of isomers containing 15-50% of the 2,3,6-isomer comes within the scope of the present invention. The unexpected and unpredictable effectiveness of our products as a herbicide is not limited to any upper limit of the 2,3,6-isomer and the mixed isomers may contain from 0 to 85% of one or more of the other isomers of trichlorobenzoic acid. For example, various mixtures of isomers containing up to about 90% of the 2,3,6-isomer have been tested and found to be as effective, if not more effective as herbicides, than the pure 2,3,6-isomer. An important practical advantage of the present mixed isomer product is that it can be produced readily in accordance with the present process to contain 60-75% of the 2,3,6-isomer. However, synergistically efficacious mixed isomer products containing up to about 90% of the 2,3,6-isomer can be prepared by upgrading, for example, the mixed isomer trichlorobenzoic acid product to increase the 2,3,6-isomer content to 90% without resorting to the complicated and expensive procedures which would be required to obtain substantially pure 2,3,6-trichlorobenzoic acid. Mixtures of isomers containing 15-50% can be produced by downgrading the mixed isomer product or by utilizing the less efficient starting materials, catalysts, etc. Thus, while a mixed isomer product containing 2,3,6-isomer in the range of 50-75% or 60-75% can be readily produced by our process, other synergistically effective mixtures of isomers can be produced and are contemplated, for example, a mixed isomer product containing 15-90% of the 2,3,6-isomer.

Within substantially the above-mentioned ranges, equivalent quantities of mixed isomers may exist also in the form of the salts of the acid. The salts of these isomeric mixtures are about equally effective with the mixed isomers of the free acid when used in equivalent amounts. The salts of the mixed isomers may be made in ways well known to a chemist skilled in this field. In all instances when reference is made to a mixture of isomers as containing a certain percentage of 2,3,6-isomer, it is understood that this is the percentage of the mixed isomers which is 2,3,6-isomer and the remainder of the mixture of isomers if, of course, one or more isomers other than 2,3,6-isomer.

The synergism of the mixed isomers and the relative ineffectiveness of the isomers other than the 2,3,6-isomer is illustrated by the following examples, although not limited to the particular conditions set forth in these examples. In these examples mention is made of the use of an equivalent weight of a salt of trichlorobenzoic acid. For example, if the effect of the mixed isomers of trichlorobenzoic acid is being considered at a certain dosage, then the amount of said acid is the dosage amount; in other words, if the dosage is 2 pounds per acre, then 2 pounds of acid per acre is used. However, if the salt is being tested, the amount of salt used is that amount equivalent to the dosage amount expressed as an acid. Thus, if the dosage is 2 lbs. per acre, the amount of salt actually applied is the amount of salt produced by the reaction of 2 lbs. of acid with the salt former and this amount of salt is applied per acre.

EXAMPLE 1

In this example, a series of comparative tests were made with substantially pure 2,3,6-trichlorobenzoic acid and a mixture of isomers of trichlorobenzoic acid containing about 70% by weight of 2,3,6-trichlorobenzoic acid with the remainder being other isomers. Of these other isomers, the 2,4,5-isomer predominated. The test procedure was carried out with beans individually planted in pots. When the trifoliate bud of the bean plant was just visible, a quantity of one of these herbicides was placed on the bud. The herbicide was applied to the bud in solution. When the trifoliate bud reached maturity, the area of the treated bud and the area of the untreated bud were measured for comparative purposes. The results are expressed in the percent area of leaf growth suppressed by the herbicide. This bean test is a recognized type of test for comparing herbicides and is considered to be a very sensitive method. Each of the mixtures was applied in various amounts and the percent leaf area suppressed was measured. The results are set forth in the following table which includes the calculated percent of leaf area which should have been suppressed by the mixed isomers based on the amount of 2,3,6-isomer present and the effectiveness of the pure 2,3,6-trichlorobenzoic acid.

Table

| Dosage Micrograms | Percent Leaf Area Suppressed | | Calculated Percent Leaf Area Suppressed by Mixed Isomers |
| --- | --- | --- | --- |
| | Pure 2,3,6-isomer | Mixed Isomers | |
| .004 | 85 | 91 | 69 |
| .002 | 64 | 66 | 45 |
| .001 | 39 | 42 | 27 |
| .0005 | 18 | 20 | 13 |

The mixed isomers were consistently somewhat more effective than the pure 2,3,6-trichlorobenzoic acid and considerably more effective than would be expected from the 2,3,6-isomer content alone.

EXAMPLE 2

This example describes tests made under comparable conditions utilizing the salt of 2,3,6-trichlorobenzoic acid (herbicide A) and a mixture of isomers of trichlorobenzoic acid (herbicide B) which contained 93-95% of 2,3,6-tirchlorobenzoic acid. Both of these herbicides were tested on rape, lambs-quarters, timothy and golden millet by planting the seeds in flats and then applying the herbicides at dosages corresponding to 1 lb. per acre and 2 lbs. per acre of area treated. The amount of salt applied was an amount equivalent to the dosage weight of acid. In the past it has been observed and consistently found, that the effectiveness of the herbicides, as determined by comparison with the controls, is indicated by the numerals "0" through "5" in increasing order of effectiveness. Thus, "0" indicates no herbicidal effect while "5" indicates extreme effectiveness.

| Herbicide | Rape | | | | | |
|---|---|---|---|---|---|---|
| | 1 lb./acre | | | 2 lbs./acre | | |
| | D | S | I | D | S | I |
| Magnesium Salt | 3 | 2 | 3 | 4 | 3 | 3 |
| Calcium Salt | 3 | 3 | 3 | 4 | 3 | 3 |
| Barium Salt | 4 | 2 | 3 | 4 | 4 | 4 |
| t-Butylamine Salt (2,3,6-isomer) | 3 | 3 | 3 | 4 | 4 | 3 |
| t-Butylamine Salt (mixed isomers) | 2 | 3 | 3 | 4 | 4 | 4 |
| t-Octylamine Salt | 3 | 3 | 3 | 4 | 4 | 3 |
| Potassium Salt | 2 | 2 | 3 | 4 | 4 | 1 |
| Lithium Salt | 3 | 3 | 3 | 4 | 3 | 3 |
| Manganese Salt | 4 | 3 | 3 | 4 | 4 | 4 |
| Aluminum Salt (basic) | 1 | 2 | 2 | 3 | 3 | 3 |
| Iron Salt (basic) | 0 | 2 | 2 | 2 | 3 | 3 |
| Zinc Salt (basic) | 2 | 3 | 3 | 4 | 3 | 3 |
| Sodium Salt | 3 | 3 | 3 | 4 | 4 | 4 |
| 2-4-D | 4 | 4 | 4 | 4 | 5 | 5 |

| Herbicide | Lambsquarters | | | | | |
|---|---|---|---|---|---|---|
| Magnesium Salt | 2 | 3 | 3 | 3 | 4 | 4 |
| Calcium Salt | 2 | 3 | 3 | 4 | 4 | 4 |
| Barium Salt | 2 | 3 | 3 | 3 | 4 | 4 |
| t-Butylamine Salt (2,3,6-isomer) | 2 | 3 | 3 | 3 | 4 | 4 |
| t-Butylamine Salt (mixed isomers) | 2 | 3 | 3 | 3 | 4 | 4 |
| t-Octylamine | 3 | 3 | 3 | 3 | 4 | 4 |
| Potassium Salt | 3 | 3 | 3 | 3 | 4 | 4 |
| Lithium Salt | 3 | 3 | 3 | 3 | 4 | 4 |
| Manganese Salt | 2 | 3 | 3 | 3 | 3 | 4 |
| Aluminum Salt (basic) | 1 | 2 | 2 | 2 | 2 | 2 |
| Iron Salt (basic) | 1 | 2 | 2 | 2 | 3 | 2 |
| Zinc Salt (basic) | 2 | 2 | 2 | 4 | 4 | 4 |
| Sodium Salt | 3 | 3 | 3 | 4 | 4 | 4 |
| 2-4-D | 0 | 3 | 0 | 2 | 3 | 1 |

| Herbicide | Timothy | | | | | |
|---|---|---|---|---|---|---|
| Magnesium Salt | 3 | 3 | 3 | 4 | 3 | 3 |
| Calcium Salt | 3 | 3 | 3 | 4 | 3 | 3 |
| Barium Salt | 4 | 4 | 4 | 4 | 4 | 4 |
| t-Butylamine Salt (2,3,6-isomer) | 3 | 3 | 3 | 4 | 4 | 4 |
| t-Butylamine Salt (mixed isomers) | 3 | 3 | 3 | 4 | 3 | 3 |
| t-Octylamine Salt | 4 | 3 | 3 | 4 | 4 | 4 |
| Potassium Salt | 4 | 3 | 3 | 4 | 4 | 3 |
| Lithium Salt | 3 | 3 | 3 | 4 | 3 | 3 |
| Manganese Salt | 3 | 2 | 3 | 4 | 3 | 3 |
| Aluminum Salt (basic) | 3 | 3 | 3 | 4 | 4 | 3 |
| Iron Salt (basic) | 4 | 3 | 3 | 4 | 3 | 3 |
| Zinc Salt (basic) | 4 | 3 | 3 | 4 | 3 | 3 |
| Sodium Salt | 4 | 3 | 3 | 4 | 3 | 4 |
| 2-4-D | 4 | 4 | 1 | 4 | 3 | 1 |

| Herbicide | Golden Millet | | | | | |
|---|---|---|---|---|---|---|
| Magnesium Salt | 2 | 4 | 3 | 2 | 4 | 4 |
| Calcium Salt | 2 | 3 | 3 | 3 | 4 | 4 |
| Barium Salt | 2 | 4 | 3 | 3 | 4 | 4 |
| t-Butylamine Salt (2,3,6-isomer) | 2 | 4 | 3 | 4 | 4 | 4 |
| t-Butylamine Salt (mixed isomers) | 2 | 4 | 3 | 4 | 4 | 4 |
| t-Octylamine Salt | 3 | 3 | 3 | 3 | 3 | 3 |
| Potassium Salt | 2 | 3 | 3 | 4 | 4 | 4 |
| Lithium Salt | 2 | 3 | 3 | 4 | 4 | 4 |
| Manganese Salt | 2 | 4 | 3 | 3 | 4 | 4 |
| Aluminum Salt (basic) | 1 | 3 | 3 | 3 | 4 | 3 |
| Iron Salt (basic) | 0 | 3 | 2 | 2 | 3 | 2 |
| Zinc Salt (basic) | 2 | 4 | 3 | 4 | 3 | 3 |
| Sodium Salt | 1 | 3 | 3 | 4 | 3 | 3 |
| 2-4-D | 4 | 3 | 0 | 4 | 5 | 1 |

EXAMPLE 5

A series of flats were planted with clover seed and a second series of flats were planted with rape seed. The flats were watered periodically as required. At nine days after planting, three different mixtures of trichlorobenzoic acid isomers in the form of their sodium salts were applied to each series of flats and the plants therein at dosages equivalent to 0.5, 1.0, 2.0 and 4 pounds per acre of trichlorobenzoic acid. In these post-emergent treatments, only one type of plant was present and only one herbicidal material was applied to any one flat. The herbicidal materials were applied as aqueous solutions of the sodium salts of the mixed isomers.

In the following table there is set forth the results as observed 15 days after spraying the flats containing 9 day old plants. In this table, values 0 to 5 indicate increasing effectiveness of the materials tested, D means density, S means size and I means injury. These values were determined by comparison with flats planted and treated in the same manner except that no herbicidal material was applied to these control flats.

Table

| Material | Clover | | | | | |
|---|---|---|---|---|---|---|
| | 0.5 lb. per acre | | | 1 lb. per acre | | |
| | D | S | I | D | S | I |
| A | 3 | 3 | 3 | 3 | 3 | 3 |
| B | 3 | 2 | 2 | 3 | 3 | 3 |
| C | 3 | 2 | 2 | 3 | 3 | 2 |
| | 2 lb. per acre | | | 4 lb. per acre | | |
| A | 4 | 4 | 4 | 5 | | |
| B | 4 | 4 | 4 | 5 | | |
| C | 4 | 4 | 3 | 5 | | |

| Material | Rape | | | | | |
|---|---|---|---|---|---|---|
| | 0.5 lb. per acre | | | 1 lb. per acre | | |
| A | 1 | 1 | 2 | 1 | 2 | 2 |
| B | 0 | 1 | 1 | 1 | 1 | 2 |
| C | 0 | 1 | 1 | 1 | 2 | 2 |
| | 2 lb. per acre | | | 4 lb. per acre | | |
| A | 2 | 2 | 4 | 3 | 4 | 4 |
| B | 1 | 2 | 3 | 3 | 4 | 4 |
| C | 1 | 2 | 2 | 2 | 2 | 4 |

In the above table, A, B and C each represent the sodium salts of a mixture of isomers of trichlorobenzoic acid, with each mixture containing the amount of 2,3,6-isomer as follows:

A contained 62% of the 2,3,6-isomer.
B contained 58% of the 2,3,6-isomer.
C contained 29% of the 2,3,6-isomer.

In these tests, materials A and B were substantially equal in effectiveness and were only slightly more effective than material C, which only contained about half as much 2,3,6-isomer. In other words, the material containing only 29% of the 2,3,6-isomer was much more effective than would be expected from the amount of 2,3,6-isomer present, particularly when the other isomers are relatively ineffective.

EXAMPLE 6

A series of flats were prepared and planted with golden millet. Four herbicidal materials were applied to separate flats on the day of planting. Each material was a mixture of trichlorobenzoic acid isomers and was applied in the form of an aqueous solution of the sodium salts of the mixed isomers. The amount of salt applied was equivalent to the dosage amounts of trichlorobenzoic acid, that is, equivalent to 1 or 2 pounds of trichlorobenzoic acid. The results are set forth in Table 1 and are based on observations made 12 days after planting. In Table 1, as in the other tables of this example, values 0 to 5 indicate increasing effectiveness of the materials tested, D means density, S means size and I means injury. These values were determined by comparison with flats planted and treated in the same manner except no herbicidal material was applied to the flats. The amount of 2,3,6-isomer present in each mixture is set forth in Table 1.

various salts of the acids are as effective as the acid when the salts are applied in the equivalent amount of acid. The results obtained are set forth in the following table in which the numerals 1 to 5 indicate increasing effectiveness of the materials. D means density, S means size and I means injury. Thus, D-5 would indicate the fewest plants, S-5 the most stunting and I-5 the greatest injury. These values were determined by comparison with plants grown under identical conditions but to which no herbicide was applied.

Table

| Herbicide | Rape | | | | | |
|---|---|---|---|---|---|---|
| | 1 lb./Acre | | | 2 lb./Acre | | |
| | D | S | I | D | S | I |
| A | 3 | 3 | 3 | 4 | 3 | 3 |
| B | 2 | 3 | 3 | 4 | 4 | 4 |
| Lambsquarters | | | | | | |
| A | 2 | 3 | 3 | 3 | 4 | 4 |
| B | 2 | 3 | 3 | 3 | 3 | 4 |
| Timothy | | | | | | |
| A | 3 | 3 | 3 | 4 | 4 | 4 |
| B | 4 | 3 | 3 | 4 | 3 | 3 |
| Golden Millet | | | | | | |
| A | 2 | 4 | 3 | 4 | 4 | 4 |
| B | 4 | 3 | 3 | 5 | 3 | 4 |

The results obtained with heribicide "B" were as good and possibly somewhat better than with heribicide "A." The amount of other, relatively ineffective isomers was sufficient so that herbicide "B" should have been on the average somewhat less effective than the pure 2,3,6-isomer. However, obtaining a mixture of isomers containing more than 90% of the 2,3,6-isomer involves relatively more expensive upgrading procedures and we accordingly prefer, for practical commercial reasons, a maximum of 90% of 2,3,6-isomer in the mixed isomers even though mixtures containing somewhat more 2,3,6-isomer are apparently synergistic in action.

EXAMPLE 3

The other isomers of trichlorobenzoic acid, namely, the 2,3,4-isomer, 2,3,5-isomer, 2,4,5-isomer, 2,4,6-isomer and 3,4,5-isomer of this acid, have very little herbicidal activity as compared to that of the 2,3,6-isomer. In this series of tests various isomers of trichlorobenzoic acid are compared with substantially pure 2,3,6-isomer and with a mixture of isomers in which the 2,3,6-isomer content is about 68–70%. In these particular experiments the sodium salts of the acids in question were dissolved in an aqueous medium and were sprayed on the "flats" at the rate of 3.8 ml. per 0.44 sq. ft. of flat area, i. e. at the rate of 100 gallons per acre. The concentration of each of the compounds involved was adapted to provide the amount of salt equivalent to the dosage amount of acid. The flats were sprayed on the same day as the seeds were planted and the observations described in the following table were made 10 days after such spraying. In this table D means density, S—size, and I—injury. The values 0 to 5 indicate increasing effectiveness of the compounds in question. The key to the code system used in this table to indicate the various herbicides which were tested is as follows:

1384 substantially pure 2,3,4-trichlorobenzoic acid
1385 substantially pure 2,4,5-trichlorobenzoic acid
1386 substantially pure 2,4,6-trichlorobenzoic acid
1496 substantially pure 2,3,5-trichlorobenzoic acid
1246 substantially pure 2,3,6-trichlorobenzoic acid
1281 mixture of isomers of trichlorobenzoic acid containing about 68–70% of 2,3,6-isomer, about 20–22% of the 2,4,5-isomer and about 10% of other isomers.

Table

| Material Sprayed | 8 Pounds Per Acre | | | | | | | | | | | |
|---|---|---|---|---|---|---|---|---|---|---|---|---|
| | Rape | | | Timothy | | | Millet | | | Clover | | |
| | D | S | I | D | S | I | D | S | I | D | S | I |
| 1384 | 0 | 0 | 1 | 0 | 1 | 0 | 0 | 1 | 1 | 0 | 1 | 0 |
| 1385 | 0 | 1 | 1 | 1 | 2 | 0 | 1 | 0 | 1 | 1 | 1 | 1 |
| 1386 | 0 | 1 | 1 | 0 | 2 | 1 | 0 | 2 | 1 | 1 | 1 | 1 |
| 1496 | 3 | 3 | 1 | 1 | 2 | 1 | 0 | 1 | 1 | 3 | 2 | 1 |
| 0.5 Pound Per Acre | | | | | | | | | | | | |
| 1246 | 0 | 0 | 3 | 2 | 2 | 3 | 1 | 1 | 3 | 1 | 2 | 3 |
| 1281 | 0 | 0 | 3 | 2 | 1 | 2 | 1 | 1 | 3 | 1 | 2 | 2 |
| 16 Pounds Per Acre | | | | | | | | | | | | |
| 1384 | 2 | 1 | 1 | 0 | 2 | 0 | 1 | 2 | 1 | 3 | 1 | 1 |
| 1385 | 0 | 1 | 1 | 0 | 2 | 0 | 1 | 2 | 1 | 3 | 1 | 1 |
| 1386 | 1 | 1 | 1 | 2 | 3 | 2 | 2 | 3 | 1 | 3 | 1 | 1 |
| 1496 | 4 | 4 | --- | 1 | 3 | 1 | 0 | 2 | 1 | 4 | 2 | 1 |
| 1.0 Pound Per Acre | | | | | | | | | | | | |
| 1246 | 3 | 0 | 3 | 4 | 3 | 3 | 2 | 2 | 3 | 1 | 3 | 3 |
| 1281 | 2 | 0 | 3 | 4 | 3 | 3 | 2 | 1 | 3 | 1 | 3 | 3 |

The results set forth above clearly show that the 2,3,6-isomer of trichlorobenzoic acid is noticeably and considerably more effective herbicidally than the other isomers of trichlorobenzoic acid although some of the latter exhibit slight herbicidal activity. The 2,3,6-isomer is more effective than the other isomers of trichlorobenzoic acid in concentrations ranging from 1/16 to 1/32 of the concentration of such other isomers under like test conditions. A mixture of isomers containing 68–70% 2,3,6-isomer in admixture with the other isomers is overwhelmingly more effective as a herbicide than any of the other isomers with the possible exception of the pure 2,3,6-isomer to which it is equivalent.

EXAMPLE 4

In this series of comparative tests, groups of flats containing soil were planted with rape, lambsquarters, timothy and golden millet seed, respectively. In each group of flats, a series of dilute solutions of various salts of trichlorobenzoic acid in water were applied at dosages equivalent to 1 and 2 pounds of acid per acre. For comparative purposes, flats in each group were treated with the triethanolamine salt of "2–4–D" at dosages equivalent to 1 and 2 pounds per acre of the acid. Flats not treated with herbicide were used as controls. Each flat contained seeds of only one kind and was treated with only one herbicide at one dosage. When herbicide was applied, it was applied the same day the flat was planted. In all cases except one, the salts of trichlorobenzoic acid were salts of the mixed isomers. In the case of the tert-butylamine salt, a salt of substantially pure 2,3,6-trichlorobenzoic acid was tested along with a salt of the mixed isomers, and these salts are distinguished in the following table by the terms "2,3,6-isomer" and "mixed isomers," respectively. The mixed isomers contained about 69% 2,3,6-isomer, 22% 2,4,5-isomer and 9% other isomers.

In the following table, the results are set forth as observed 12 days after planting. In this table, the letters, "D," "S" and "I" refer to density of the plants, size of the plants and injury to the plants, respectively. The

Table 1

| Material | Percent 2,3,6-isomer | Golden Millet—Pounds Per Acre 1.0 | | | 2.0 | | |
|---|---|---|---|---|---|---|---|
| | | D | S | I | D | S | I |
| A | 68 | 4 | 3 | 3 | 5 | 2 | 2 |
| B | 48 | 3 | 3 | 3 | 4 | 2 | 1 |
| C | 30 | 1 | 1 | 2 | 2 | 1 | 3 |
| D | 19 | 0 | 1 | 2 | 2 | 1 | 1 |

Material B was not quite as effective as material A. Both of these were considerably more effective than materials C and D, and, accordingly, mixtures of isomers containing at least 50%, and for optimum results at least 60% of the 2,3,6-isomer, are preferred from the standpoint of maximum effectiveness per pound of material. However, the above mixtures of isomers C and D containing only 30% and 19% of the 2,3,6-isomer are much more effective than can be accounted for by the relatively small amount of 2,3,6-isomer present in these mixtures. The other isomers present cannot account for the unexpected effectiveness of materials C and D. Trichlorobenzoic acid containing no 2,3,6-isomer has been tested on each of rape, lambsquarters, golden millet and timothy at dosages of 1, 2 and 4 pounds per acre, respectively, and there was no herbicidal effect on these plants at these dosages when observed 15 days after planting of the seeds and application of the material.

The synergistic effect of mixed isomers of trichlorobenzoic acid is apparent upon comparing the effect of the aforesaid materials C and D with the effect produced by pure 2,3,6-isomer, that is, the materials C and D are as effective, if not more effective, than are amounts of pure 2,3,6-isomer larger than the amounts of 2,3,6-isomer present in materials C and D. In Table 2 there are set forth the results produced in two tests using pure 2,3,6-isomer on golden millet in flats under the same conditions as materials C and D were used. In test 1 pure 2,3,6-isomer was applied at dosages of 0.5 pound and 1.0 pound per acre, and in test 2 pure 2,3,6-isomer was applied at 0.25 pound and 0.5 pound per acre. Except for a slight inconsequential difference in the observation period, tests 1 and 2 were carried out in the same place, under the same conditions, by the same party, as were the tests of Table 1 and the results are comparable.

Table 2

| Pure 2,3,6-isomer | Golden Millet 0.25 lb./A. | | | 0.5 lb./A. | | | 1 lb./A. | | |
|---|---|---|---|---|---|---|---|---|---|
| | D | S | I | D | S | I | D | S | I |
| Test No. 1 | | | | 1 | 1 | 3 | 2 | 2 | 3 |
| Test No. 2 | 0 | 0 | 2 | 1 | 3 | 3 | | | |

Material C at 1 pound per acre and containing 0.3 pound of the 2,3,6-isomer is substantially as effective as 0.5 pound per acre of the 2,3,6-isomer and this material, when used in an amount to apply only 0.6 pound per acre, is substantially as effective as 1 pound per acre of pure 2,3,6-isomer. Material D also shows this synergistic effect. Material D, when used at a rate of 1 pound per acre of the mixed isomers, containing only 0.19 pound of the 2,3,6-isomer, is more effective than 0.25 pound of the 2,3,6-isomer. This unexpected effectiveness also is produced at larger dosages as 2 pounds of material D, containing only 0.38 pound of the 2,3,6-isomer, is more effective than 0.5 pound of the pure 2,3,6-isomer and is nearly as effective as 1 pound of the pure 2,3,6-isomer. While a pound of mixed isomers containing from 15% to about 50% of the 2,3,6-isomer is not as effective as a pound of pure 2,3,6-isomer as are mixtures of isomers containing higher percentages of the 2,3,6-isomer, the mixed isomers containing such small amounts of the 2,3,6-isomer are more effective than total separate effects of the isomers and synergistic.

From these and also from other tests utilizing polychlorobenzoic acids containing amounts of 2,3,6-trichlorobenzoic acid considerably less than 15%, for example, 4–8%, it is known that the synergistic effect either is not present or is so slight that it cannot be observed when the 2,3,6-isomer is at some unknown value appreciably below 15%. Accordingly, we have limited our invention to trichlorobenzoic acid or its salt containing at least 15% of the 2,3,6-isomer. As a practical matter, mixed isomers of trichlorobenzoic acid can be readily produced on a commercial scale containing 20%, or more, of the 2,3,6-isomer and such mixtures would be used. In the foregoing remarks, as well as throughout this application and in the accompanying claims, all percentages are by weight and the percentage of 2,3,6-isomer is based on the total weight of trichlorobenzoic acid isomers, or their salts, regardless of what other materials are present.

We claim:

1. A composition selected from the group consisting of a mixture of isomers of trichlorobenzoic acid and salts of said mixture of isomers, said isomeric mixture containing from about 20% to about 90% of the 2,3,6-isomer based on the total weight of the mixture of isomers.

2. A composition selected from the group consisting of a mixture of isomers of trichlorobenzoic acid and salts of said mixture of isomers, said isomeric mixture containing from 20% to 50% of the 2,3,6-isomer based on the total weight of the mixture of isomers.

3. A composition selected from the group consisting of a mixture of isomers of trichlorobenzoic acid and salts of said mixture of isomers, said isomeric mixture containing from about 50 to 75% of 2,3,6-trichlorobenzoic acid and the remainder being other isomers of trichlorobenzoic acid.

4. A composition selected from the group consisting of a mixture of isomers of trichlorobenzoic acid and salts of said mixture of isomers, said isomeric mixture containing from about 60 to 75% of 2,3,6-trichlorobenzoic acid and the remainder being other isomers of trichlorobenzoic acid.

References Cited in the file of this patent

UNITED STATES PATENTS 2,726,947     Baumgartner     Dec. 13, 1955

OTHER REFERENCES

Zimmerman et al.: Contributions of Boyce Thompson Institute, vol. 16, Jan.–Mar. 1951, pp. 209–13.